US012718579B2

(12) United States Patent
Guo et al.

(10) Patent No.: US 12,718,579 B2
(45) Date of Patent: Aug. 25, 2026

(54) BIRD'S EYE VIEW BASED CAMERA-TO-CAMERA ALIGNMENT IN VEHICLES

(71) Applicant: GM GLOBAL TECHNOLOGY OPERATIONS LLC, Detroit, MI (US)

(72) Inventors: Xiaobo Guo, Northville, MI (US); Xinyu Du, Oakland Township, MI (US); Hao Yu, Troy, MI (US); Yao Hu, Sterling Heights, MI (US); Mohsen Khalili, Sterling Heights, MI (US); Yousef Adnan Omar, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 139 days.

(21) Appl. No.: 18/741,353

(22) Filed: Jun. 12, 2024

(65) Prior Publication Data

US 2025/0384693 A1 Dec. 18, 2025

(51) Int. Cl.

| | |
|---|---|
| ***G06V 20/56*** | (2022.01) |
| ***G06T 5/40*** | (2006.01) |
| ***G06V 10/25*** | (2022.01) |
| ***G06V 10/44*** | (2022.01) |
| ***G06V 10/80*** | (2022.01) |
| ***H04N 23/695*** | (2023.01) |

(52) U.S. Cl.

CPC ................ *G06V 20/56* (2022.01); *G06T 5/40* (2013.01); *G06V 10/25* (2022.01); *G06V 10/44* (2022.01); *G06V 10/806* (2022.01); *H04N 23/695* (2023.01)

(58) Field of Classification Search

None

See application file for complete search history.

(56) References Cited

U.S. PATENT DOCUMENTS

| | | | | |
|---|---|---|---|---|
| 8,373,763 | B2 | 2/2013 | Zhang et al. | |
| 11,428,541 | B1 | 8/2022 | Khalili et al. | |
| 2017/0136948 | A1* | 5/2017 | Sypitkowski | H04N 5/265 |
| 2021/0319237 | A1* | 10/2021 | Kim | G06V 10/755 |
| 2023/0215026 | A1 | 7/2023 | Du et al. | |
| 2023/0256975 | A1 | 8/2023 | Li et al. | |
| 2023/0260157 | A1 | 8/2023 | Li et al. | |
| 2023/0260291 | A1 | 8/2023 | Li et al. | |

OTHER PUBLICATIONS

U.S. Appl. No. 18/169,081, filed Feb. 14, 2023, Du et al.
U.S. Appl. No. 18/169,352, filed Feb. 15, 2023, Li et al.

* cited by examiner

*Primary Examiner* — James M Anderson, II

(57) ABSTRACT

A vehicle system includes a first camera configured to capture original images in a first perspective relative to a vehicle and a second camera configured to capture original images in a second perspective relative to the vehicle, and a control module configured to receive a first original image from the first camera and a second original image from the second camera, select an overlapping local region of interest from the first original image and the second original image for a birds eye view image, create the birds eye view image having the local region of interest, detect features in the birds eye view image, map detected features in the birds eye view image to the first original image and the second original image, and align at least the first camera and the second camera using the detected features. Other example vehicle systems and methods are also disclosed.

20 Claims, 11 Drawing Sheets

BIRD'S EYE VIEW BASED CAMERA-TO-CAMERA ALIGNMENT IN VEHICLES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle camera-to-camera alignment using detected features from a created Bird's Eye View (BEV) image.

Vehicles include onboard cameras to provide information about the surrounding environment that can be used for various operations of the vehicles. For instance, some vehicles (e.g., autonomous vehicles, semi-autonomous vehicles, etc.) may rely on cameras having different perspectives of the surrounding environment to plan and/or control operations of the vehicle, such as a motion and/or a trajectory. In such examples, camera alignments empower such vehicles with 360 degree viewing and autonomous driving features. Such alignments include camera-to-vehicle alignment, camera-to-camera alignment, and camera-to-ground alignment.

SUMMARY

A vehicle system includes a plurality of cameras having a first camera configured to capture original images in a first perspective relative to a vehicle and a second camera configured to capture original images in a second perspective relative to the vehicle different than the first perspective, and a control module in communication with the plurality of cameras. The control module is configured to receive a first original image from the first camera and a second original image from the second camera, select an overlapping local region of interest from the first original image and the second original image for a birds eye view image, create the birds eye view image having the local region of interest based on pixel values of at least one of the first original image and the second original image and locations of the first camera and the second camera, detect features in the birds eye view image, map detected features in the birds eye view image to the first original image and the second original image, and align at least the first camera and the second camera using the detected features.

In other features, the control module is configured to control an operation of the vehicle based on the alignment between the first camera and the second camera.

In other features, the first camera is a front fisheye camera configured to capture original images in a front perceptive of the vehicle, and the second camera is a left-side or right-side fisheye camera configured to capture original images in a left or right perceptive of the vehicle.

In other features, the control module is configured to receive at least two frames corresponding to different times of the first original image from the first camera and at least two frames corresponding to different times of the second original image from the second camera, subtract pixel values from the at least two frames of the first original image to obtain a normalized first original image, subtract pixel values from the at least two frames of the second original image to obtain a normalized second original image, detect features in the normalized first original image and the normalized second original image, and combine the detected features from the normalized first original image and the normalized second original image and the detected features from the birds eye view image.

In other features, the control module is configured to generate a histogram equalized image based on the birds eye view image, detect features in the histogram equalized image, and combine the detected features from the histogram equalized image and the detected features from the birds eye view image.

In other features, the control module is configured to detect features in the birds eye view image using a spatial model of the local region of interest.

In other features, the spatial model includes a first feature matching threshold associated with a first area of the local region of interest adjacent to the vehicle and a second feature matching threshold associated with a second area of the local region of interest remote to the vehicle as compared to the first area of the local region of interest, and the second feature matching threshold is larger than the first feature matching threshold.

In other features, the control module is configured to detect features in the local region of interest for the birds eye view image based on the first feature matching threshold and the second feature matching threshold.

In other features, the control module is configured to filter one or more of the detected features.

In other features, the control module is configured to filter the one or more of the detected features based on an association gate having a defined pixel area.

In other features, the control module is configured to filter the one or more of the detected features based on a defined distance threshold.

A method for aligning a first camera and a second camera of a vehicle, includes receiving a first original image from the first camera and a second original image from the second camera, selecting an overlapping local region of interest from the first original image and the second original image for a birds eye view image, creating the birds eye view image having the local region of interest based on pixel values of at least one of the first original image and the second original image and locations of the first camera and the second camera, detecting features in the birds eye view image, mapping detected features in the birds eye view image to the first original image and the second original image, aligning at least the first camera and the second camera using the detected features, and controlling an operation of the vehicle based on the alignment between the first camera and the second camera.

In other features, receiving the first original image from the first camera and the second original image from the second camera includes receiving at least two frames corresponding to different times of the first original image from the first camera and at least two frames corresponding to different times of the second original image from the second camera.

In other features, the method further includes subtracting pixel values from the at least two frames of the first original image to obtain a normalized first original image, subtracting pixel values from the at least two frames of the second original image to obtain a normalized second original image, detecting features in the normalized first original image and the normalized second original image, and combining the detected features from the normalized first original image and the normalized second original image and the detected features from the birds eye view image.

In other features, the method further includes generating a histogram equalized image based on the birds eye view image, detecting features in the histogram equalized image, and combining the detected features from the histogram equalized image and the detected features from the birds eye view image.

In other features, detecting features in the birds eye view image includes detecting features in the birds eye view image using a spatial model of the local region of interest.

In other features, the spatial model includes a first feature matching threshold associated with a first area of the local region of interest adjacent to the vehicle and a second feature matching threshold associated with a second area of the local region of interest remote to the vehicle as compared to the first area of the local region of interest, and the second feature matching threshold is larger than the first feature matching threshold.

In other features, the method further includes filtering one or more of the detected features based on an association gate having a defined pixel area or based on a defined distance threshold.

A method for detecting features from a birds eye view image to align a first camera and a second camera of a vehicle, includes receiving a first original image from the first camera and a second original image from the second camera, creating the birds eye view image based on the first original image and the second original image, detecting features in the birds eye view image including by implementing at least one pre-processing technique, mapping detected features in the birds eye view image to the first original image and the second original image, and aligning at least the first camera and the second camera using the detected features.

In other features, receiving the first original image from the first camera and the second original image from the second camera includes receiving at least two frames corresponding to different times of the first original image from the first camera and at least two frames corresponding to different times of the second original image from the second camera.

In other features, implementing at least one pre-processing technique includes subtracting pixel values from the at least two frames of the first original image to obtain a normalized first original image, subtracting pixel values from the at least two frames of the second original image to obtain a normalized second original image, detecting features in the normalized first original image and the normalized second original image, and combining the detected features from the normalized first original image and the normalized second original image.

In other features, implementing at least one pre-processing technique includes generating a histogram equalized image based on the birds eye view image, detecting features in the histogram equalized image and features in the birds eye view image, and combining detected features from the histogram equalized image and detected features from the birds eye view image.

In other features, the method further includes selecting an overlapping local region of interest from the first original image and the second original image for the birds eye view image.

In other features, detecting features in the birds eye view image includes detecting features in the birds eye view image using a spatial model of the local region of interest.

In other features, the spatial model includes a first feature matching threshold associated with a first area of the local region of interest adjacent to the vehicle and a second feature matching threshold associated with a second area of the local region of interest remote to the vehicle as compared to the first area of the local region of interest, and the second feature matching threshold is larger than the first feature matching threshold.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 13-1 and 13-2 are flowcharts of an example process for online camera-to-camera alignment using detected features from a created BEV image, according to the present disclosure.

In the drawings, reference numbers may be reused to identify similar and/or identical elements.

DETAILED DESCRIPTION

Vehicles include onboard cameras to provide information about the surrounding environment that can be used for various control operations of the vehicles, such as motion and/or trajectory of the vehicles. In such examples, the vehicles (e.g., autonomous vehicles, semi-autonomous vehicles, etc.) rely on one or more camera alignments, such as a camera-to-vehicle alignment, a camera-to-camera alignment, and a camera-to-ground alignment. Such camera alignments are often critical for perception and vehicle control. For example, a camera-to-ground alignment may be critical for perception but often results in accuracy degradation due to road bank angle for side vehicle cameras. Additionally, while a conventional camera-to-camera alignment may improve side camera accuracy for road bank angle issues in some cases, this approach relies on perspective views for feature matching causing long convergence times and results that do not meet requirements. Further, the camera-to-camera alignment relies on multiple regions of interest that are sensitive and need a large amount of tuning work for different vehicles.

The vehicle systems and methods according to the present disclosure provide a technical approach to enable camera-to-camera alignment based on feature matching from a created BEV image. With this approach of camera-to-camera alignment using features from a BEV image, camera alignment accuracy is improved as compared to conventional camera-to-camera alignment techniques based on perspective views. This results in improved performance of mapping, perception, localization, etc. and in turn vehicle control operations. Additionally, in various embodiments, the vehicle systems and methods herein may implement image pre-processing, post-filters, and mature procedures to achieve more accurate results.

Figure 1:
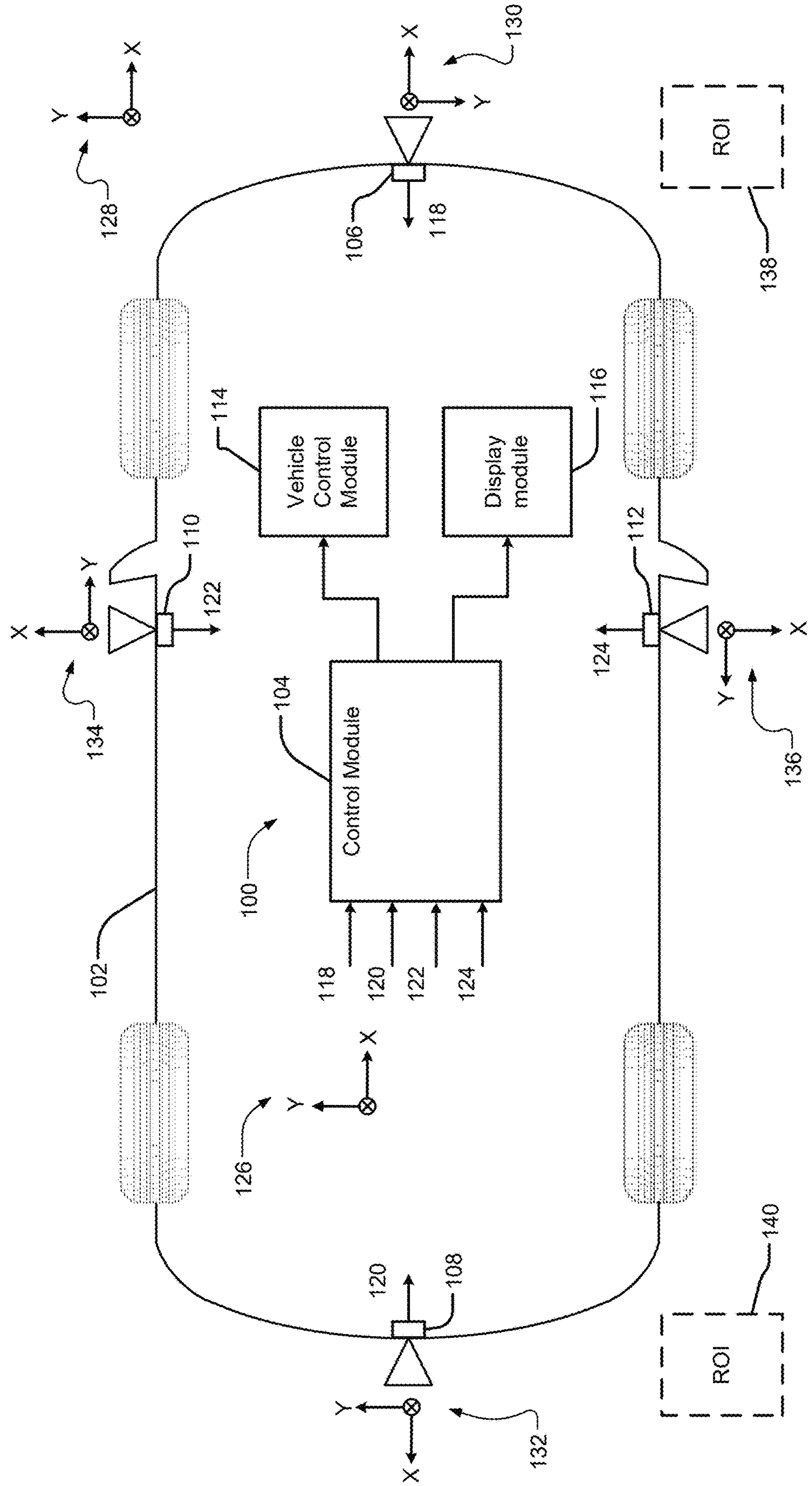
FIG. 1 is a block diagram of an example vehicle system for online camera-to-camera alignment using detected features from a created BEV image, according to the present disclosure.

Referring now to FIG. 1, a block diagram of an example vehicle system 100 is presented for aligning at least one camera of a vehicle 102 with an object associated with the vehicle 102. As shown in FIG. 1, the vehicle system 100 generally includes a control module 104, cameras 106, 108, 110, 112, a vehicle control module 114, and a display module 116. Although FIG. 1 illustrates the vehicle system 100 as including specific dedicated modules, it should be appreciated that one or more other modules may be employed if desired. For example, any combination of the modules (e.g., the control module 104, the vehicle control module 114, the display module 116, etc.) and/or the functionality thereof may be integrated into a single module or multiple different modules. Additionally, although FIG. 1 illustrates four specifically arranged cameras 106, 108, 110, 112, it should be appreciated that any number of cameras can be arranged on the vehicle 102.

In the example of FIG. 1, the cameras 106, 108, 110, 112, the vehicle control module 114, and the display module 116 are in communication with the control module 104. In such examples, the modules and cameras of the vehicle system 100 may share parameters via a network, such as a controller area network (CAN) and signals. For example, in FIG. 1, the control module 104 receives signals 118, 120, 122, 124 representing image (or image data) from the cameras 106, 108, 110, 112, respectively.

The vehicle system 100 of FIG. 1 may be employable in any suitable vehicle, such as an autonomous vehicle, a semi-autonomous vehicle, etc. Additionally, the vehicle system 100 may be applicable to electric vehicles (e.g., a pure electric vehicle, a plug-in hybrid electric vehicle, etc.) and internal combustion engine (ICE) vehicles. In the example of FIG. 1, the vehicle system 100 is employed in the vehicle 102 (e.g., an autonomous vehicle). In this example, the vehicle 102 has an associated vehicle-centered coordinate system 126, in which the X-axis extends to the right (e.g., to the front of the vehicle 102), the Y-axis extends to the left (e.g., the left side of the vehicle 102), and the Z-axis (not shown) points upward. A ground-centered coordinate system 128 defines a reference frame of the ground or terrain outside of the vehicle 102. The ground-centered coordinate system 128 includes similar axes as the vehicle-centered coordinate system 126 but having a different center point (0, 0, 0).

In FIG. 1, the cameras 106, 108, 110, 112 capture original images relative to the vehicle 102. In such examples, each captured image may include a single frame or multiple frames. In this example, the cameras 106, 108, 110, 112 are directed to different surrounding areas of the vehicle 102 and provide different perspectives. For example, the camera 106 is a front camera for capturing original images in a front perceptive of the vehicle 102 (e.g., generally in front of the vehicle 102), the camera 108 is a rear camera for capturing original images in a rear perceptive of the vehicle 102 (e.g., generally behind of the vehicle 102), the camera 110 is a left-side camera for capturing original images in a left perceptive of the vehicle 102, and the camera 112 is a right-side camera for capturing original images in a right perceptive of the vehicle 102. In such embodiments, some of the cameras 106, 108, 110, 112 may capture overlapping environments. For instance, the front camera 106 and the left-side camera 110 may capture the same features but at different perspectives, such as features in front and to the left side of the vehicle 102. Similarly, the front camera 106 and the right-side camera 112 may capture the same features but at different perspectives, such as features in front and to the right side of the vehicle 102.

In various embodiments, the cameras 106, 108, 110, 112 can be wide-angle cameras, fish-eye cameras, etc. In such examples, non-linear distortions or optical aberrations may occur at the edges of their fields of view. In other examples, the cameras 106, 108, 110, 112 may be other suitable types of sensors if desired.

Each camera 106, 108, 110, 112 of FIG. 1 has an associated coordinate system that defines a reference frame for that camera. For example, the front camera 106 has an associated front coordinate system 130, the rear camera 108 has an associated rear coordinate system 132, the left-side camera 110 has an associated left coordinate system 134, and the right-side camera 112 has an associated right coordinate system 136. For each camera's coordinate system 130, 132, 134, 136, the X-axis generally extends away from the camera along the principal axis of the camera and the Z-axis points toward the ground. In FIG. 1, the coordinate systems 130, 132, 134, 136 of the cameras 106, 108, 110, 112 are right-handed. As such, for the front camera 106, the Y-axis extends to the right of the vehicle 102, for the rear camera 108, the Y-axis extends to the left of the vehicle 102, for the left-side camera 110, the Y-axis extends to the front of the vehicle 102, and for the right-side camera 112, the Y-axis extends to the rear of the vehicle 102. Although FIG. 1 illustrates specifically arranged coordinate systems for the cameras 106, 108, 110, 112, it should be appreciated that other suitable coordinate systems (e.g., different axes, etc.) may be employed. For example, the Z-axes may point upwards (away from the ground), the Y-axes may extend in opposite directions, etc.

In the example of FIG. 1, the vehicle system 100 of FIG. 1 enables the online alignment of multiple cameras of the vehicle 102, such as at least two of the cameras 106, 108, 110, 112 using ensembled features from a generated BEV image. For example, the control module 104 loads or otherwise receives original images (or data representing the original images) from at least two of the cameras 106, 108, 110, 112 via the signals 118, 120, 122, 124. Then, the control module 104 creates a BEV image based on the received original images and implements feature matching in the created BEV image, as further explained herein. This approach of feature matching in the created BEV image enables a more accurate feature detection than conventional techniques utilizing feature matching with original (e.g., raw) perspective images.

In various embodiments, the control module 104 receives original or raw images from the front camera 106 and one of the side cameras 110, 112 for creation of the BEV image. For instance, the control module 104 may receive original images from the front camera 106 and the left-side camera 110 or from the front camera 106 and the right-side camera 112. In either case, the control module 104 may use the front camera 106 as a reference as opposed to, for example, the rear camera 108 due to distances between a possible region of interest (ROI) and both cameras. For example, if a front-right ROI 138 (e.g., in a front-right location relative to the vehicle 102) or a rear-right ROI 140 (e.g., in a rear-right location relative to the vehicle 102) is possible for selection, the distances between the front-right ROI 138 and both the front camera 106 and the right-side camera 112 are close. In contrast, the distance between the rear-right ROI and the rear camera 108 is close but the distance between the rear-right ROI and the right-side camera 112 is far away. As such, if the control module 104 relies on the front camera 106 and one of the side cameras 110, 112, the quality of the created BEV image is much greater than if the rear camera 108 is employed.

After the original images from the front camera 106 and one of the side cameras 110, 112 are received, the control module 104 selects an overlapping local ROI from the received original images for creation of the BEV image. For instance, the control module 104 may select the front-right ROI 138 of FIG. 1 that overlaps perspectives from the front camera 106 and the right-side camera 112, or another suitable local ROI, such as a front-left ROI that overlaps perspectives from the front camera 106 and the left-side camera 110.

Next, the control module 104 creates the BEV image having the local ROI. In various embodiments, the creation of the BEV image with the ROI may be accomplished based on pixel values of the received original images (e.g., the original images from the front camera 106 and the original images from left-side camera 110 or the right-side camera 112) and locations of the cameras 106, 110, 112 capturing the utilized images. In such examples, the BEV image may include a BEV view associated with the front camera 106 and a BEV view associated with one of the side cameras 110, 112.

Figure 2:
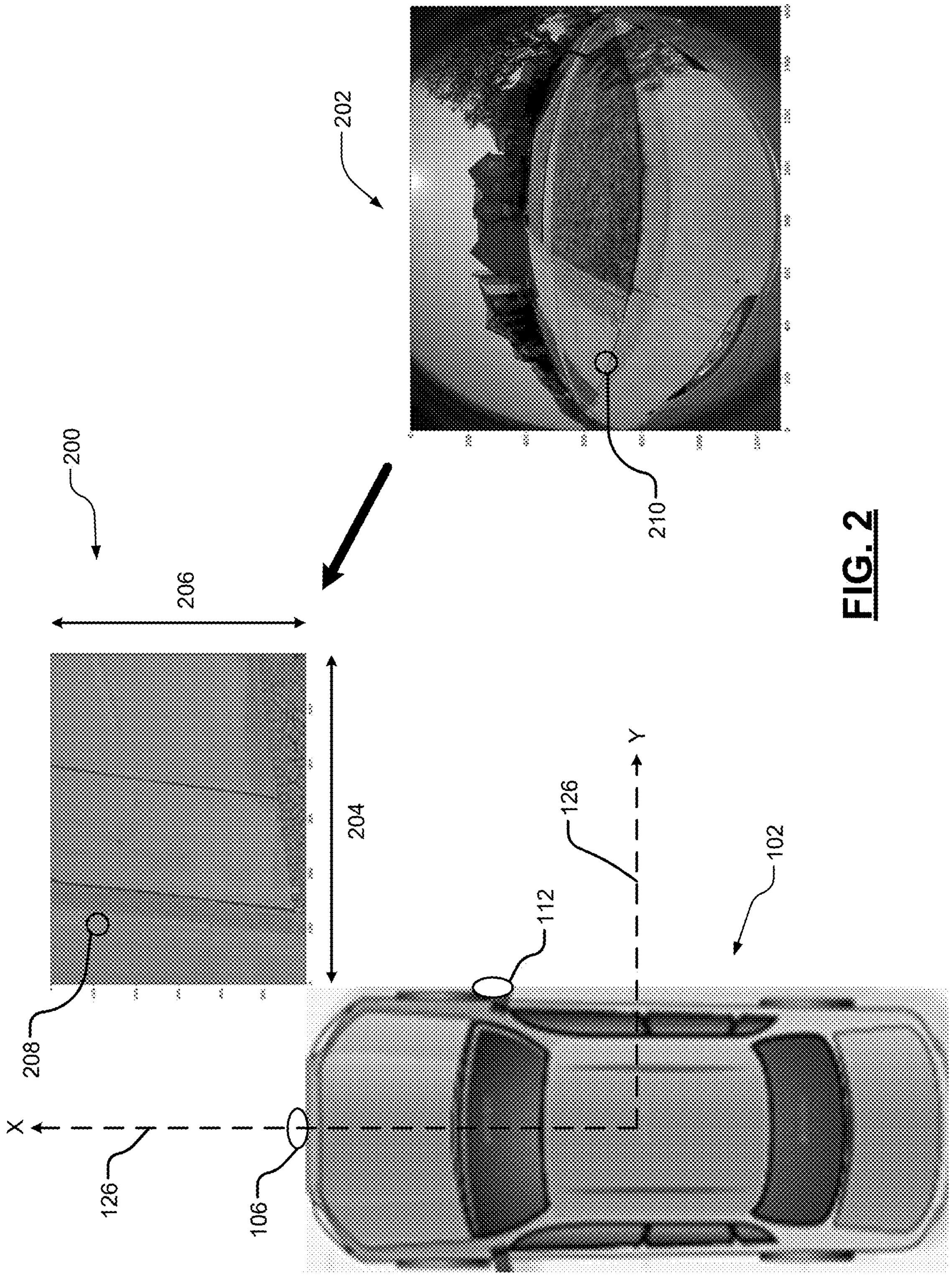
FIG. 2 depicts an example process for generating a BEV image based on an original image captured from a right-side camera, according to the present disclosure.

For example, FIG. 2 depicts an example process for generating a BEV image with a selected ROI. In FIG. 2, the vehicle 102 of FIG. 1 is shown as including the front camera 106, the right-side camera 112, and the vehicle-centered coordinate system 126 explained above. Additionally, the process of FIG. 2 illustrates a BEV image 200 corresponding to the selected ROI that overlaps perspectives from the front camera 106 and the right-side camera 112, and an image 202 representing an original (raw) image captured from the right-side camera 112. In the example of FIG. 2, the BEV image 200 corresponds to BEV views associated with right-side camera 112 and the front camera 106, and the image 200 has a width (W) dimension shown by arrow 204 and a height (H) dimension shown by arrow 206. In this example, W and H represent a real-world rectangular ground.

In FIG. 2, the control module 104 creates the BEV image based on data from the image captured from the right-side camera 112. For instance, a pixel 208 in the image 200 may have a coordinate value of X, Y, Z relative to the vehicle-centered coordinate system 126 and a real-world ground coordinate value of Xr, Yr, Zr. In such examples, the coordinate value of Xr, Yr may be determined accordingly to Equations (1) and (2) below, and Zr is zero (0) since the BEV ROI is on the ground. In Equation (1), $t_{x\_front\text{-}FE}$ represents a location of the front camera 106, $H_r$ represents the top of the BEV ROI in the height (H) dimension (along the upper horizontal edge of the image 200), and y represents a location of the pixel 208 in the X direction (in the vehicle-centered coordinate system 126). In Equation (2), $t_{y\_sidet\text{-}FE}$ represents a location of the right-side camera 112 and x represents a location of the pixel 208 in the Y direction (in the vehicle-centered coordinate system 126).

$$X_r = t_{x\_front\text{-}FE} + H_r - y \quad \text{Equation (1)}$$

$$Y_r = t_{y\_side\text{-}FE} + x \quad \text{Equation (2)}$$

$$Z_r = 0$$

In various embodiments, the control module 104 may rely on a known camera-to-ground alignment for an initial guess of rotation angles of the cameras 106, 108, 110, 112. The initial guess may be used to estimate camera positions relative to the vehicle 102.

Then, once the location of the pixel 208 is known, the control module 104 may find a corresponding pixel 210 in the original image 202 from the right-side camera 112. In such examples, the original image 202 may have a coordinate system u, v. In various embodiments, the control module 104 may implement a projection function between the real-world coordinate (Xr, Yr, Zr) and a coordinate (u1, v1) in the original image 202 to locate the corresponding pixel in the original image 202. Once the corresponding pixel 210 in the original image 202 is located, the control module 104 can assign the known RGB pixel value of the pixel 210 to the pixel 208 of the image 200 (BEV ROI). This sequence may occur for each pixel in the image 200 with respect to the original image 202 from the right-side camera 112 and an original image from the front camera 106.

After the BEV image is created, the control module 104 of FIG. 1 detects features in the BEV image. For example, the control module 104 may implement any suitable technique for feature detection in the created BEV image. As one example, the control module 104 may detect one or more feature pairs by matching corresponding features. In such examples, the features may be detected based on at least one feature matching threshold. In some examples, however, portions of the BEV image may be of low quality due to distance away from the from the cameras 106, 112 (or the cameras 106, 110). For instance, the upper region of the ROI for the BEV image has a low image quality due to its distance away from the cameras. In such scenarios, the control module 104 may detect less matched feature pairs as compared to the bottom region of the ROI for the BEV image if the same feature matching threshold is employed for both regions. As such, the control module 104 may rely on multiple feature matching thresholds for feature detection.

For instance, the control module 104 may detect the features in the BEV image using a spatial model of the local ROI, such as the BEV ROI represented by the image 200 of FIG. 2. The spatial model may include multiple different feature matching thresholds for different areas of the ROI. In such examples, the control module 104 may detect features in the ROI for the BEV image based on the feature matching thresholds and the location of the possibly detected feature.

Figure 3:
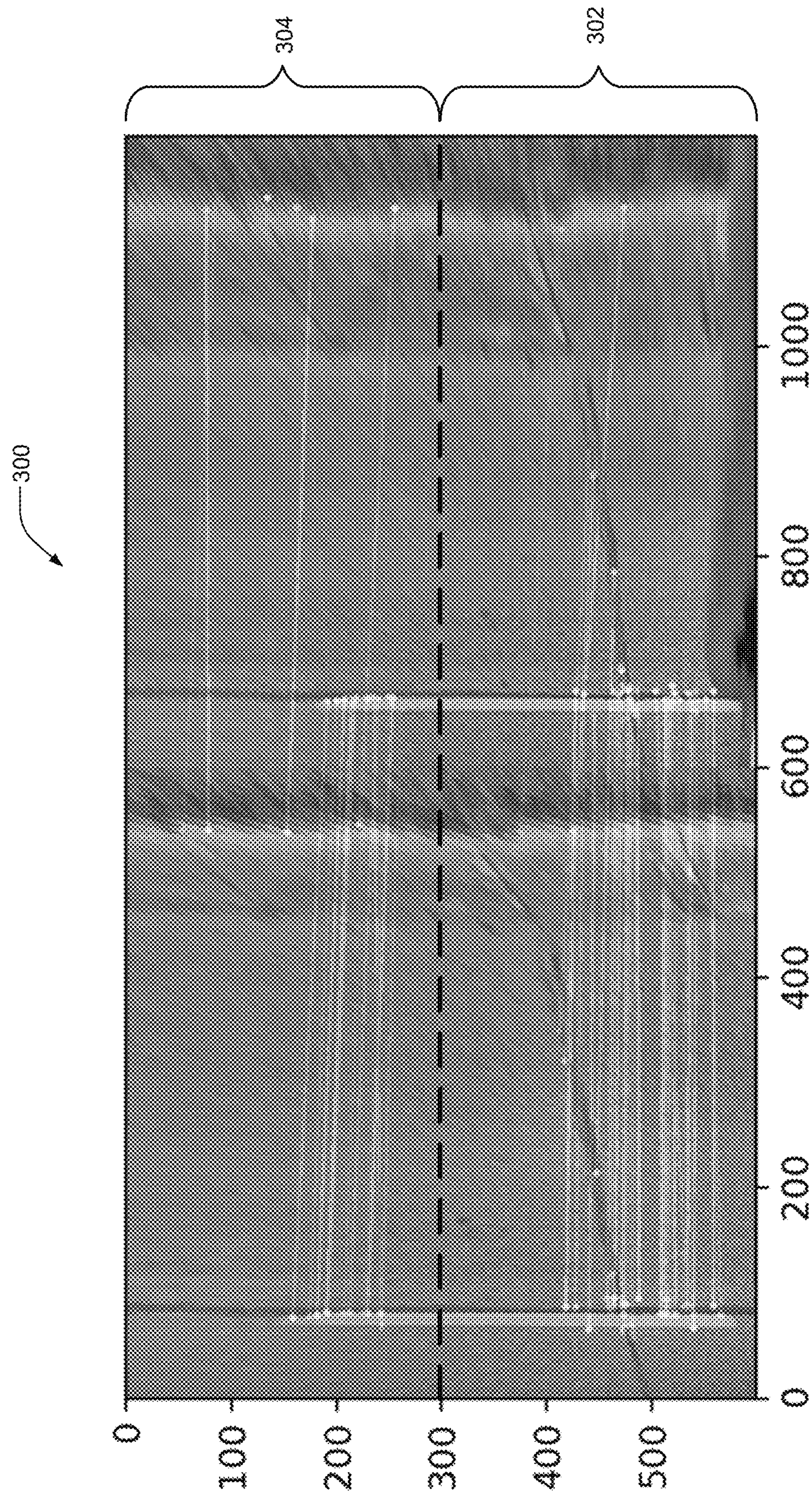
FIG. 3 depicts an example BEV image having different areas corresponding to different feature matching threshold of a spatial model, according to the present disclosure.

As one example, FIG. 3 depicts an image 300 representing a BEV ROI. In the example of FIG. 3, a spatial model may be generated for the BEV ROI and include at least two feature matching thresholds. For example, the spatial model may include one feature matching threshold associated with an area 302 of the BEV ROI adjacent to the vehicle and another feature matching threshold associated with an area 304 of the BEV ROI remote to the vehicle as compared to the area 302. In this example, the feature matching threshold associated with the area 304 is larger (or higher) than the feature matching threshold associated with the area 302 to compensate for the lower image quality in the area 304. Although FIG. 3 illustrates the image 300 with the spatial model broken into two areas with two feature matching thresholds, it should be appreciated that the spatial model may be broken into three or more areas each with different feature matching thresholds.

Then, the control module 104 may detect features in the ROI for the BEV image 300 based on the feature matching thresholds and the location of the possibly detected feature. For example, if a matching score of one feature pair in the area 304 is less than the feature matching threshold associated with that area 304, the control module 104 may identify that feature pair as a detected feature. Otherwise, if the matching score of the feature pair in the area 304 is greater than the feature matching threshold, the control module 104 may not identify that feature pair as a detected feature. Similar determinations can be made for a matching score of a feature pair in the area 302 and its feature matching threshold.

In various embodiments, the control module 104 may then map the detected features in the BEV image to the original images from the cameras 106, 112 (or the cameras 106, 110). For instance, the control module 104 may implement a reverse procedure of the BEV image creation based on corresponding pixels, explained above relative to FIG. 2. In such examples, once one or more features in the BEV image are detected, their 3D real-world ground coordinate values are known, the control module 104 may determine or estimate 3D coordinate values (Xr, Yr, Zr) for the features. Then, the control module 104 may implement the projection function to project the 3D coordinate values back to the original images.

Figure 4:
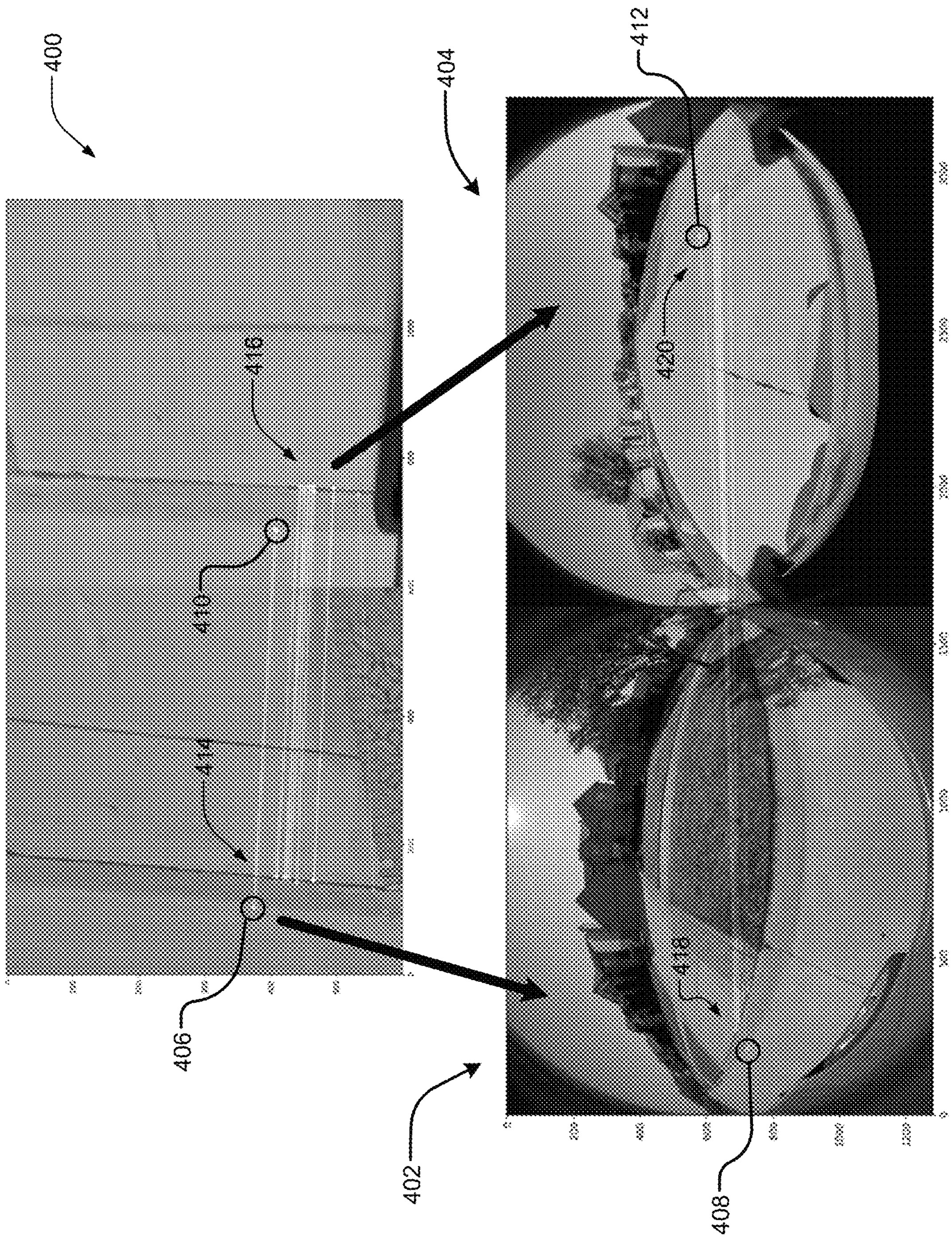
FIG. 4 depicts an example process for mapping detected features in a BEV image to original images from a front camera and a side camera, according to the present disclosure.

For example, FIG. 4 depicts an example process for mapping detected features in the BEV image to the original images from the cameras 106, 112. In FIG. 4, the process illustrates an image 400 representing a BEV ROI with multiple detected feature pairs 414, 416, an original image 402 from the right-side camera 112, and original image 404 from the front camera 106. As shown, one set of features pairs 414, 416 corresponds to pixels 406, 410 in the image 400. In this example, the control module 104 may implement the projection function to map a 3D coordinate value for the pixel 406 to a pixel 408 in the original image 402 and to map a 3D coordinate value for the pixel 410 to a pixel 412 in the original image 404. In such examples, all of the detected feature pairs 414, 416, may be mapped to the original images 402, 404 as features 418, 420.

With continued reference to FIG. 1, the control module 104 can then perform a camera-to-camera alignment with respect to multiple cameras of the vehicle 102, such as the cameras capturing the original images relied upon. For example, if the cameras 106, 112 are used to capture the original images, the control module 104 can use the detected features (e.g., feature pairs) to align those cameras 106, 112 and/or other cameras (e.g., the cameras 108, 110) of the vehicle 102. In other examples, if the cameras 106, 110 are used to capture the original images, the control module 104 can use the detected features (e.g., feature pairs) to align those cameras 106, 110 and/or other cameras (e.g., the cameras 108, 112) of the vehicle 102. This may be generally accomplished via the coordinate systems 130, 132, 134, 136 for particular cameras explained above.

In various embodiments, the control module 104 may implement one or more techniques, such as BEV image pre-processing techniques to increase feature detections. For example, when a surrounding environment (e.g., a roadway) lacks texture, the control module 104 may detect a low number of features from the BEV image. In such examples, the control module 104 can implement a normalized background subtraction technique to normalize the BEV image and detect additional features. Then, the control module 104 may combine the features detected in the created BEV image and the features detected in the normalized BEV image.

For example, the control module 104 may receive at least two frames corresponding to different times of the original image from the front camera 106 and at least two frames corresponding to different times of the original image from the right-side camera 112 (or the left-side camera 110). Then, the control module 104 subtracts pixel values from the received frames from the front camera 106 to obtain a normalized image, and subtracts pixel values from the received frames from the right-side camera 112 (or the left-side camera 110) to obtain another normalized image. The normalized images may then be used to detect features (e.g., in a normalized BEV image) via any suitable detection method, such as an oriented fast and rotated brief (ORB) feature detection method, etc. The control module 104 may then combine the features detected from the normalized images (e.g., a normalized BEV image) and the features detected from the BEV image.

For example, a normalized image for the front camera 106 and a normalized image for the right-side camera 112 (or the left-side camera 110) may be determined accordingly to Equations (3) and (4) below. In Equation (3), $\mathrm{Img}(t)_{Front\text{-}FE}$ represents one frame from the front camera 106 and $\mathrm{Img}(t-1)_{Front\text{-}FE}$ represents another earlier frame from the front camera 106. Similarly, in Equation (4), $\mathrm{Img}(t)_{Side\text{-}FE}$ represents one frame from one of the side cameras 110, 112 and $\mathrm{Img}(t-1)_{Side\text{-}FE}$ represents another earlier frame from that same camera.

$$\text{Normalized } Img(t)_{Front-FE} = Img(t)_{Front-FE} - Img(t-1)_{Front-FE} \quad \text{Equation (3)}$$

$$\text{Normalized } Img(t)_{Side-FE} = Img(t)_{Side-FE} - Img(t-1)_{Side-FE} \quad \text{Equation (4)}$$

Figure 5:
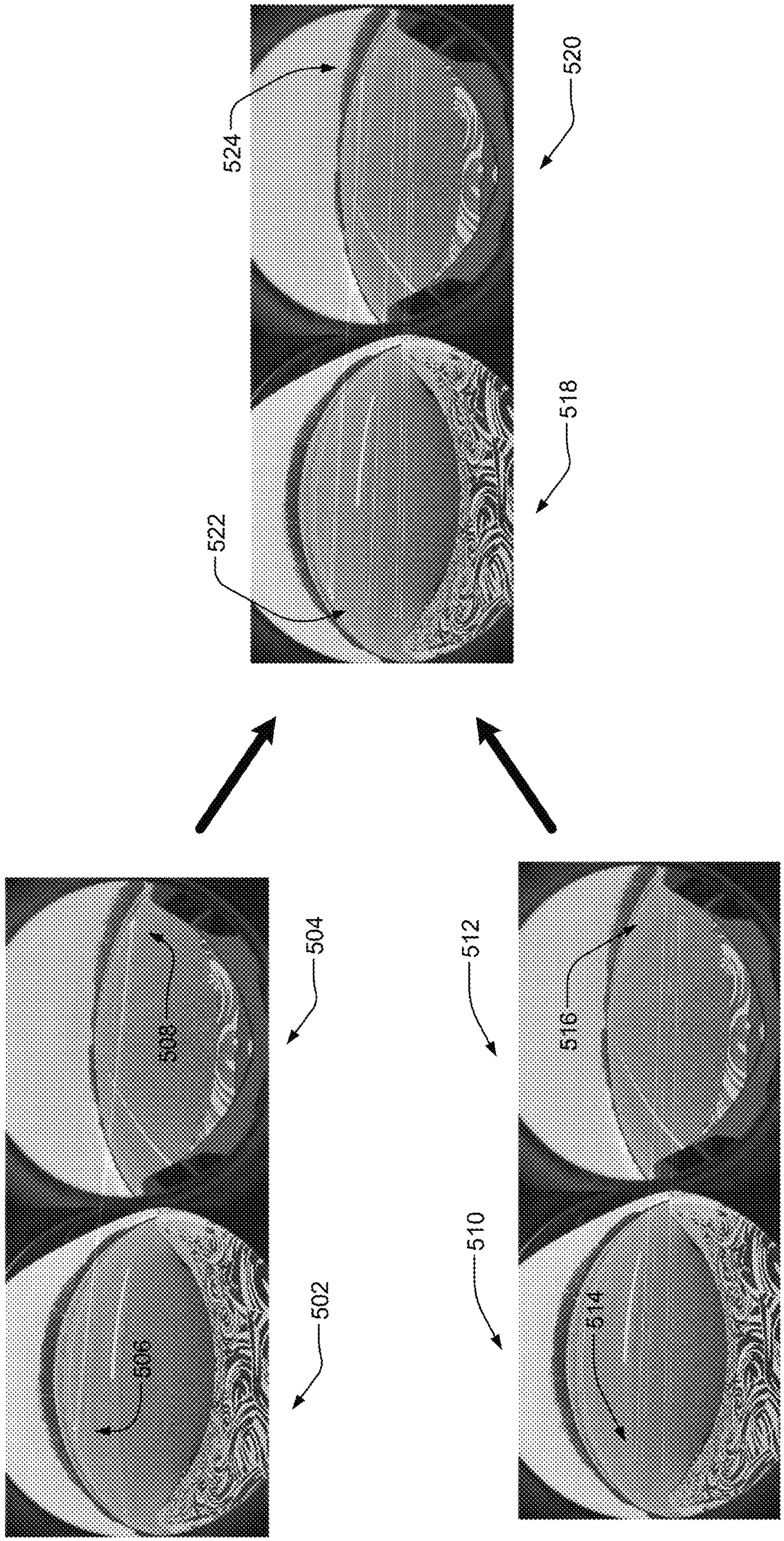
FIG. 5 depicts an example process for combining features detected from a normalized image and features detected from a BEV image, according to the present disclosure.

As one example, FIG. 5 depicts one example process for combining features detected from the normalized images (e.g., a normalized BEV image) and features detected from the BEV image. In FIG. 5, the process includes images 502, 504 having features 506, 508 detected from a BEV image and images 510, 512 having features 514, 516 detected from a normalized BEV image. The control module 104 combines the images 502, 504, 510, 512 with the features 506, 508, 514, 516 into images 518, 520 having combined features 522, 524. In this example, the images 502, 510, 518 correspond to an original image from the right-side camera 112 and the images 504, 512, 520 correspond to an original image from the front camera 106.

With continued reference to FIG. 1, the control module 104 may additionally or alternatively implement another technique to increase feature detections. For example, the control module 104 can implement an image adaptive histogram equalization technique to help improve image contrast and increase the amount of detected features. In such examples, the control module 104 generate a histogram equalized image based on the created BEV image, detect features in the histogram equalized image, and then combine the detected features from the histogram equalized image and the detected features from the BEV image (without the image adaptive histogram equalization).

Figure 6:
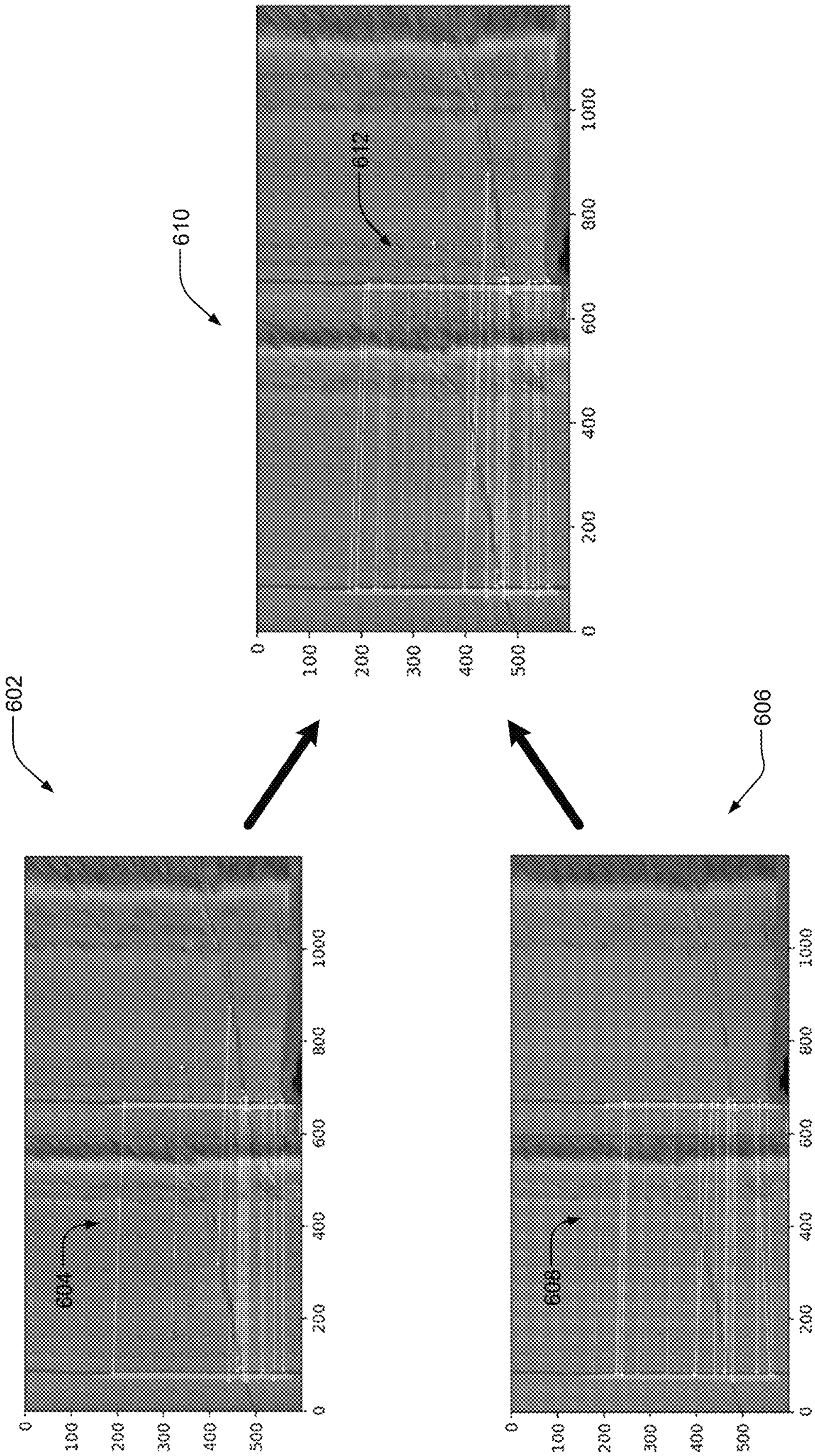
FIG. 6 depicts an example process for combining features detected from a histogram equalized image and features detected from a BEV image, according to the present disclosure.

For example, FIG. 6 depicts one example process for combining features detected from the histogram equalized image and features detected from the BEV image. In FIG. 6, the process includes a histogram equalized image 602 having detected feature pairs 604 and a BEV image 606 having detected feature pairs 608. The control module 104 combines the images 602, 606 and their feature pairs 604, 608 into an image 610 with combined feature pairs 612.

In various embodiments, the control module 104 of FIG. 1 may also implement one or more filtering techniques to filter or remove one or more of the detected features. For instance, thresholds may be set to detect a large number of features, some of which may be inaccurate. While the thresholds may be adjusted to reduce the number of feature detections and inaccuracies, some features may still be problematic. In such examples, one or more filtering techniques may be implemented to remove coordinates associated with some detected feature.

Figure 7:
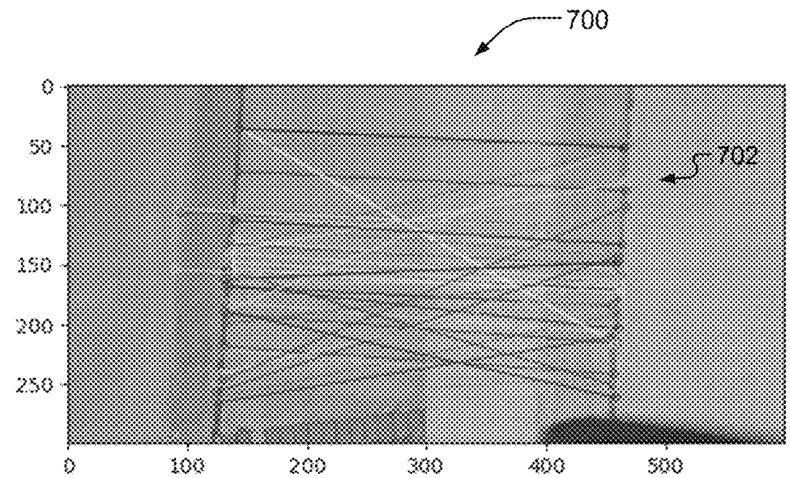
FIG. 7 depicts an example BEV image in which no filtering is employed on detected features, according to the present disclosure.
Figure 8:
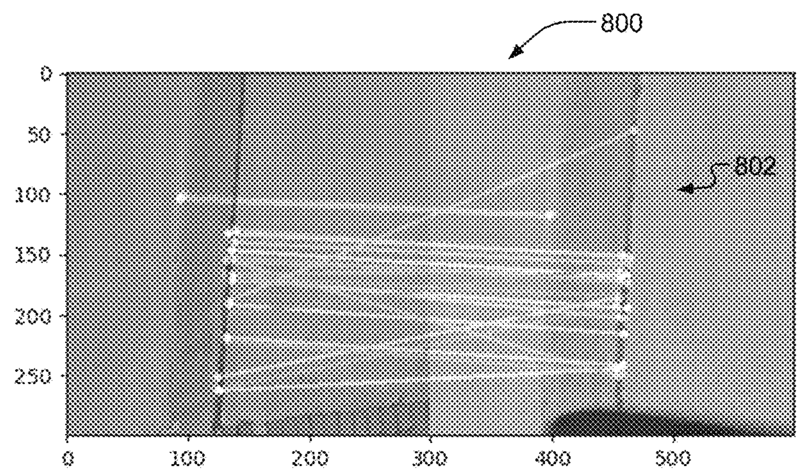
FIGS. 8-9 depicts example BEV images in which filtering is employed on detected features, according to the present disclosure.
Figure 9:
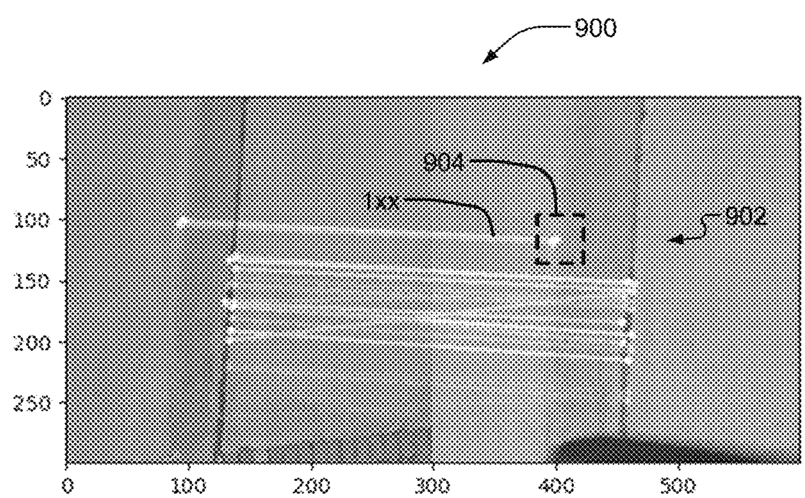

For example, FIG. 7 depicts an example BEV image 700 in which no filtering is employed on detected features 702, and FIGS. 8-9 depict example BEV images 800, 900 in which filtering is employed on detected features 802, 902. In FIG. 8, the control module 104 may filter out feature pairs based on one or more descriptor thresholds.

In FIG. 9, the control module 104 may filter out feature pairs based on a predication error. For example, a prediction may be that the same feature in the BEV image of the right-side camera 112 (or the left-side camera 110) should have the same x, y coordinate value in the BEV image of the front camera 106. In such examples, due to the error from initial guess, an association gate (e.g., a 50×50 pixel gate, a 60×30 pixel gate, etc.) may be used to keep the good feature pairs and filter out the bad feature pairs. In other words, the control module 104 may filter one or more of the detected features based on an association gate having a defined pixel area (e.g., 50×50, etc.). For example, in FIG. 9, an association gate 904 is shown. In this example, a detected feature pair 906 (of the detected features 902) is shown as falling within the association gate 904, and therefore is not filtered out. If, however, the detected feature pair 906 falls outside of the association gate 904, that feature pair may be removed from consideration.

Figure 10:
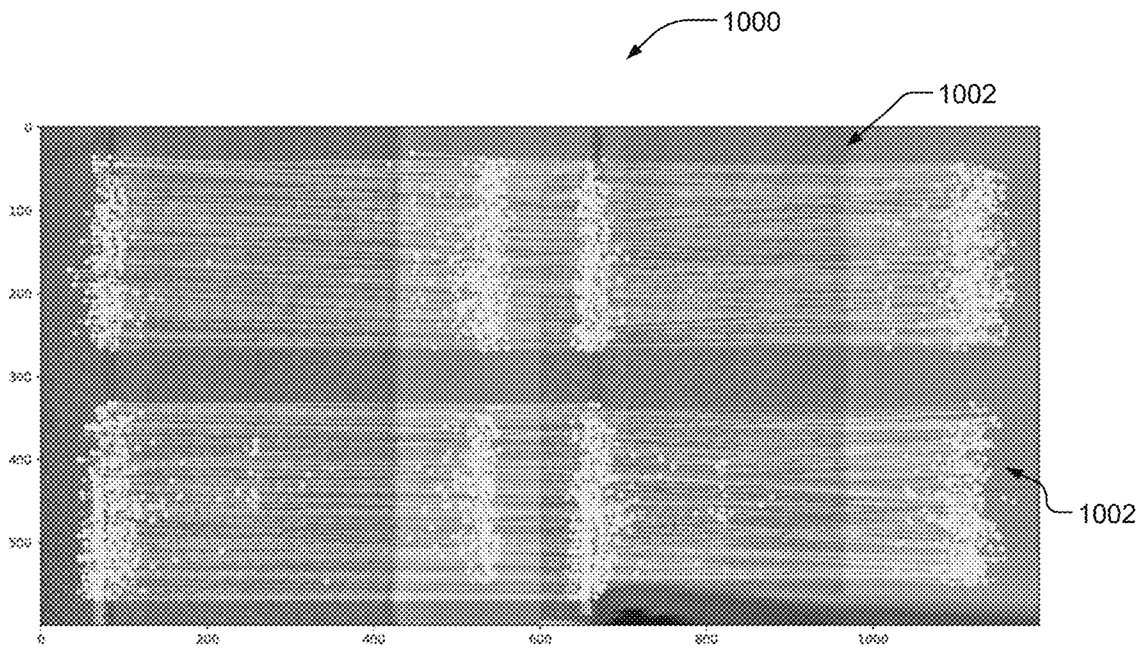
FIGS. 10-11 depicts example BEV images including detected features accumulated across multiple frames prior to filtering and after filtering, according to the present disclosure.
Figure 11:
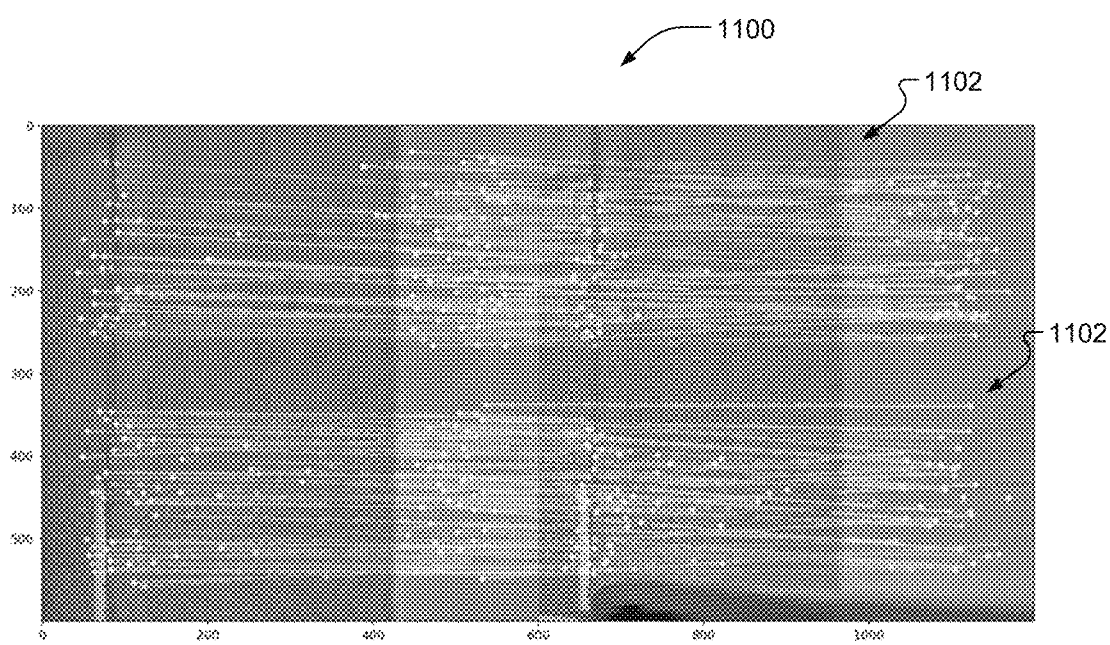

In various embodiments, the control module 104 of FIG. 1 may additionally or alternatively implement another filtering technique. For example, to achieve higher accuracy of an essential matrix for camera-to-camera alignment, it is generally preferred to detect features covering the entire BEV image over multiple frames. In such examples, detected features accumulated across multiple frames ensures a large number of features for securing an accurate essential matrix calculation. However, in many cases, some features may be redundant over the frames as relative positions of the features are fixed. This results in multiple detected features that are located relatively close to each other. This unnecessary redundancy causes reduced performance and processing speed. As such, the control module 104 may filter some of the redundant accumulated features based on a defined distance threshold if desired. For example, FIG. 10 depicts a BEV image 1000 including detected features 1002 accumulated across multiple frames prior to filtering, and FIG. 11 depicts an image 1100 including detected features 1102 accumulated across multiple frames after filtering.

In some embodiments, the control module 104 of FIG. 1 may implement post processing techniques to obtain calibration parameters, such as roll, pitch, and yaw angles. These calibration parameters may be used to convert between camera-to-camera alignments, camera-to-vehicle alignments, and camera-to-ground alignments. For example, testing has shown that the roll angle of a right-side camera-to-ground alignment is only sensitive to the pitch angle of a camera-to-camera alignment. As such, a camera-to-camera alignment may be relied upon based on the convergency of the camera-to-camera pitch angle. In such examples, a sliding window may be used to select the converged camera-to-camera pitch angle along with the corresponding camera-to-camera roll and yaw angles for the roll angle calculation of a right-side camera-to-ground alignment.

In various embodiments, the vehicle system 100 may control one or more vehicle operations based on the alignment between the cameras 106, 108, 110, 112. For instance, the control module 104 may publish any camera-to-camera alignment results to downstream vehicle control applications. In such examples, the control module 104 may generate a control signal for the vehicle control module 114 to control an operation of the vehicle 102 based on the camera-to-camera alignment and one or more control commands. In doing so, the vehicle system 100 may rely on, among other things, the camera-to-camera alignment to plan and/or control operations of the vehicle 102, such as a motion or trajectory of the vehicle 102.

Additionally, in some examples, the vehicle system 100 may display an image for the driver and/or passengers in the vehicle 102 based on the camera-to-camera alignment. For example, the control module 104 may generate a control signal for the display module 116 to cause the display of an image based on the alignment. Then, the driver and/or passengers in the vehicle 102 may be made aware of feature(s) in the surrounding environment.

Figure 12:
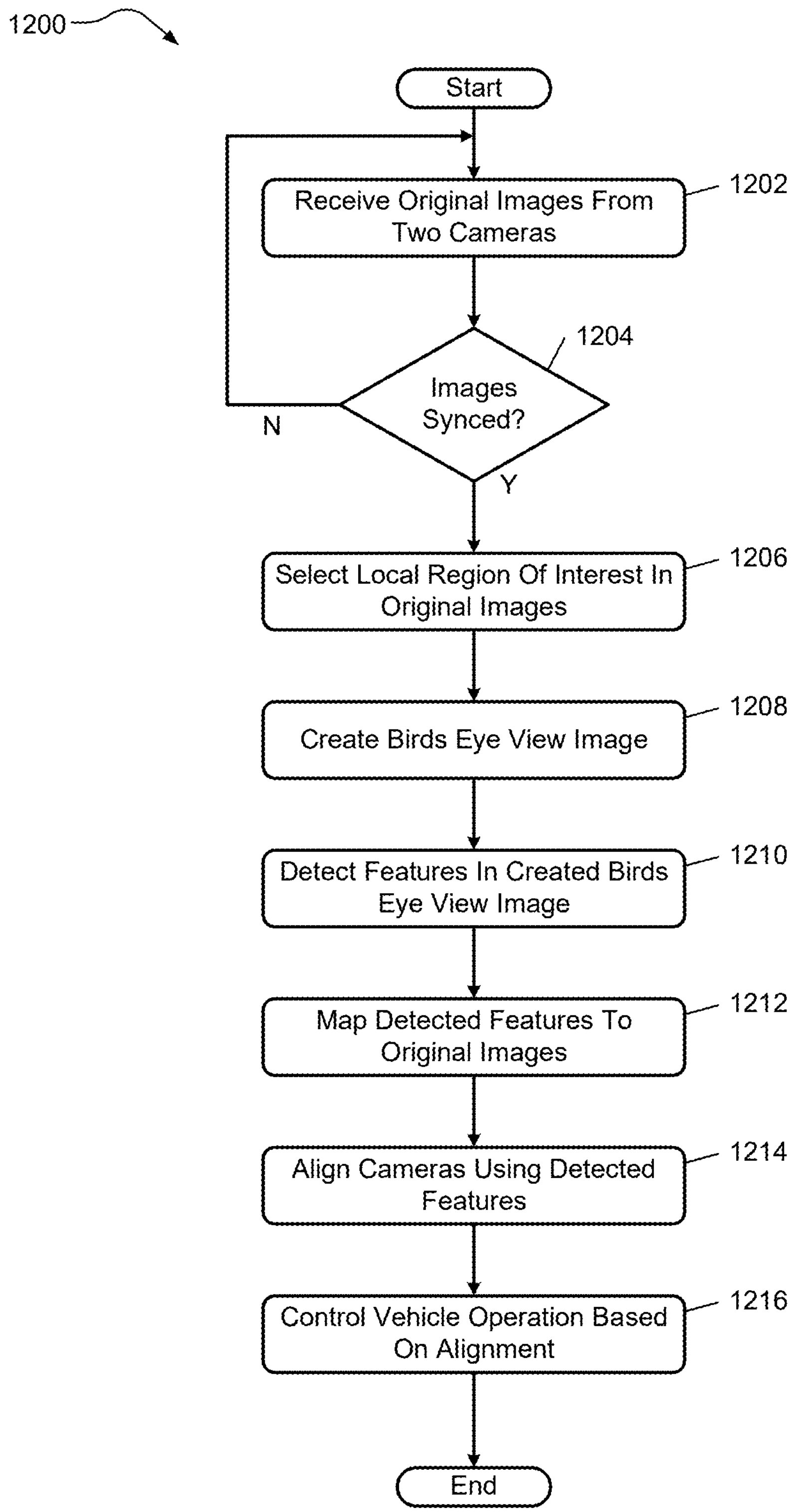
FIG. 12 is a flowchart of an example process for online camera-to-camera alignment using detected features from a created BEV image, according to the present disclosure.
Figures 1, 13:
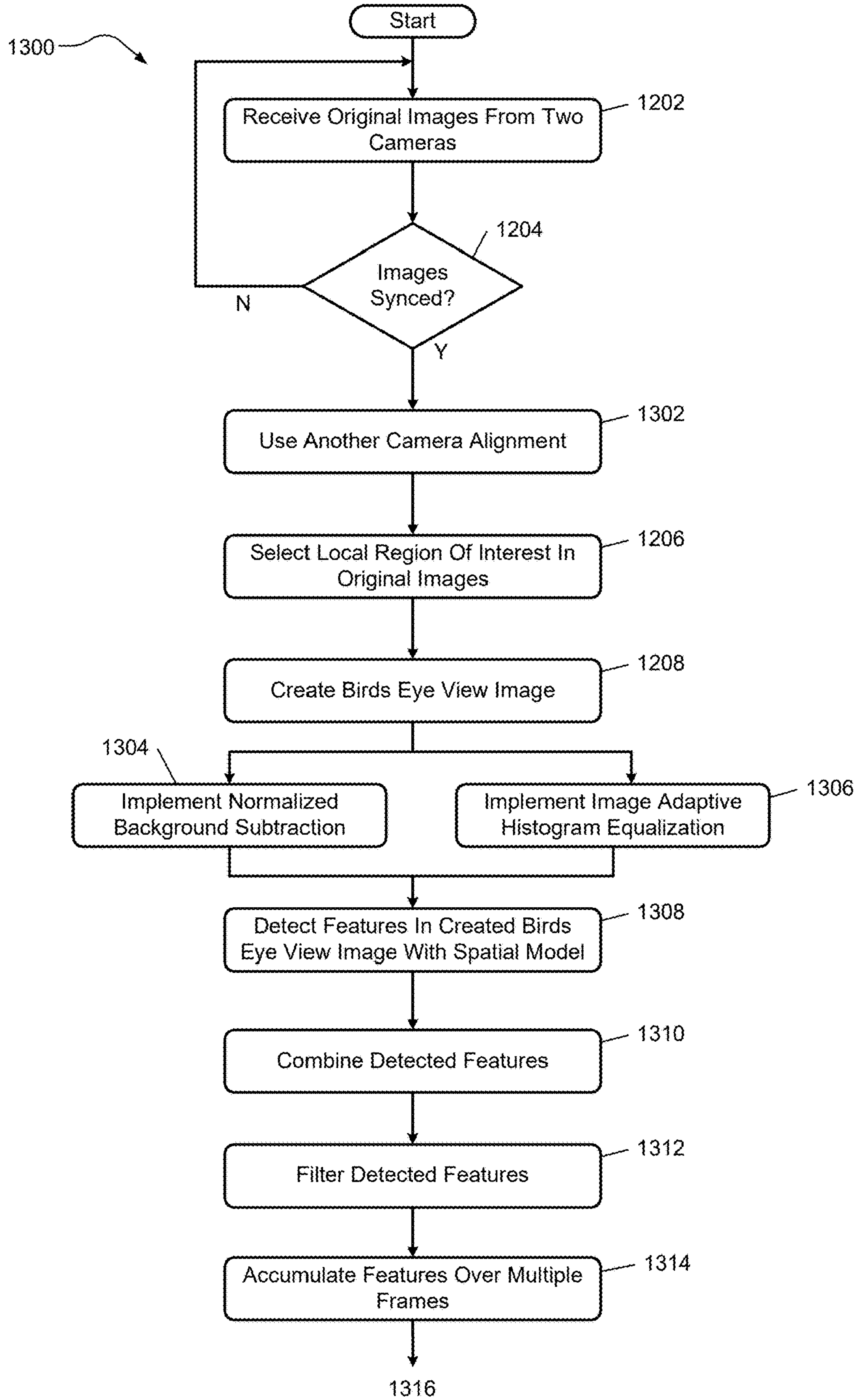
Figures 2, 13:
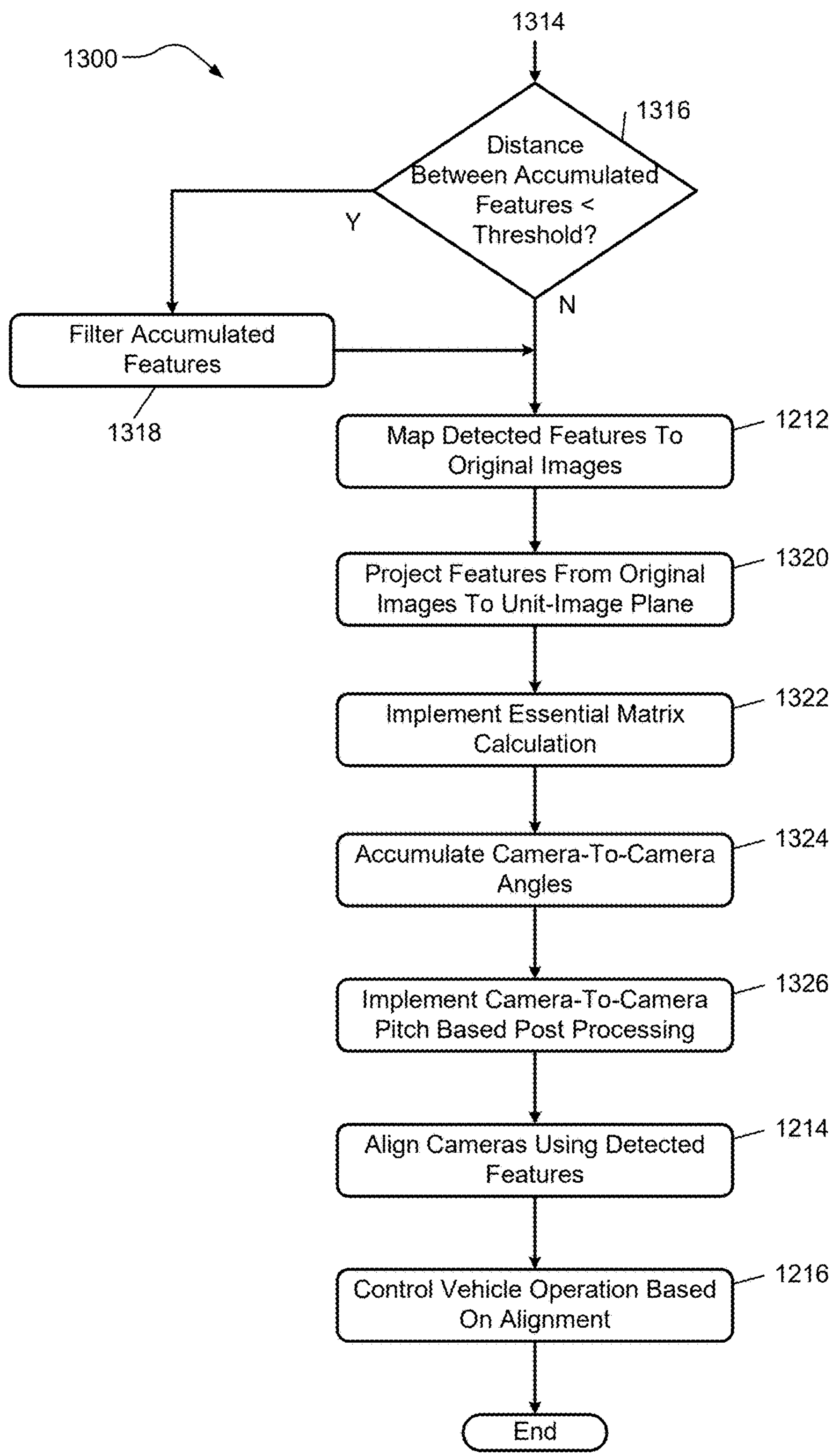

FIGS. 12-13 illustrate example processes 1200, 1300 employable by the vehicle system 100 of FIG. 1 for online camera-to-camera alignment in the vehicle 102 using detected features from a created BEV image. The process 1300 is shown across FIGS. 13-1 and 13-2 (collectively referred to as FIG. 13 herein). Although the example processes 1200, 1300 are described in relation to the vehicle system 100, the control module 104, and the vehicle 102 of FIG. 1, any one of the processes 1200, 1300 may be employable by another suitable vehicle system, control module, and/or vehicle.

As shown in FIG. 12, the process 1200 begins at 1202 by receiving or otherwise loading original images from two cameras, such the front camera 106 and one of the left-side camera 110 and the right-side camera 112 of FIG. 1. In such examples, the received original images are raw, distorted perceptive views. The process 1200 then proceeds to 1204, the control module 104 determines whether the received original images are synced. For example, the control module 104 may determine if the raw, distorted perceptive views correspond to the same time frame and therefore synced or not. If no at 1204, the process 1200 returns to 1202. If yes at 1204, the process 1200 proceeds to 1206.

At 1206, the control module 104 determines selects an overlapping local ROI from the received original images, such as a ROI located in a front-right position relative to the vehicle 102. The process 1200 then proceeds to 1208, where the control module 104 creates a BEV image with respect to the selected ROI. In such examples, the BEV image may include BEV views associated with the front camera 106 and the left-side camera 110 or the right-side camera 112 capturing the original images. In various embodiments, the BEV image may be created based on pixel values of the received original images and locations of the cameras capturing the utilized images, as explained above. The process 1200 then proceeds to 1210.

At 1210, the control module 104 detects features in the created BEV image. For example, and as explained above, the control module 104 may detect one or more feature pairs by matching corresponding features, detect features using a spatial model of the ROI, etc. The process 1200 then proceeds to 1212, where the control module 104 maps the detected features in the BEV image to the original (raw) images as explained above. The process 1200 then proceeds to 1214.

At 1214, the control module 104 aligns the cameras of the vehicle 102 based on the detected features. For example, and as explained above, the control module 104 may perform a camera-to-camera alignment with respect to multiple cameras of the vehicle 102, such as the cameras capturing the original images relied upon. The process 1200 then proceeds to 1216, where the control module 104 controls an operation of the vehicle 102 based on the alignment. For example, and as explained above, the control module 104 may generate a control signal for the vehicle control module 114, which can rely on the alignment of the cameras to plan and/or control operations of the vehicle 102, such as a motion or trajectory of the vehicle 102. The process 1200 then ends as shown in FIG. 12 or may optionally return to 1202 or another suitable step.

In FIG. 13, the process 1300 is similar to the process 1200 of FIG. 12 but includes additional steps. For example, and as shown in FIG. 13, the process 1300 begins at 1202 of FIG. 12 where the control module 104 receives or otherwise loads original images from two cameras, such the front camera 106 and one of the left-side camera 110 and the right-side camera 112 of FIG. 1. Then, the process 1300 proceeds to 1204 of FIG. 12 where the control module 104 determines whether the received original images are synced. If no, the process 1300 returns to 1202. If yes, the process 1300 proceeds to 1302.

At 1302, the control module 104 may rely on another camera alignment for an initial guess of rotation angles of the cameras 106, 108, 110, 112. For example, the control module 104 may rely on a known camera-to-ground alignment for estimating camera positions relative to the vehicle 102. The process 1300 then proceeds to 1206, 1208 as explained above relative to FIG. 12. Next, the process 1300 proceeds to 1304, 1306.

At 1304, the control module 104 implements a normalized background subtraction technique to normalize the BEV image and detect features in the normalized image. For example, and as explained above, the control module 104 may generate normalized images based on multiple frames from the original image from the front camera 106 and of the original image from the right-side camera 112 or the left-side camera 110. At 1306, the control module 104 implements an image adaptive histogram equalization technique. With this technique, the control module 104 generates a histogram equalized image based on the created BEV image and then detects features in the histogram equalized image, as explained above. The process 1300 then proceeds to 1308.

At 1308, the control module 104 detects features in the BEV image with a spatial model of the ROI. For example, and as explained above, the spatial model may include multiple different feature matching thresholds for different areas of the ROI. In such examples, the control module 104 may detect features in the ROI for the BEV image based on matching scores of feature pairs, the feature matching thresholds and the location of the feature pairs, as explained above. The process 1300 then proceeds to 1310, where the control module 104 combines the detected features from the normalized images (from 1304), the detected features from the histogram equalized image (from 1306), and the detected features from the BEV image (from 1308). The process 1300 then proceeds to 1312.

At 1312, the control module 104 implements one or more filtering techniques to filter or remove one or more of the detected features. For example, and as explained above, the control module 104 may filter out feature pairs based on one or more descriptor thresholds and/or based on a association gate having a defined pixel area. The process 1300 then proceeds to 1314, 1316.

At 1314 and 1316, the control module 104 implements additional filtering technique to filter some of the redundant features accumulated over multiple frames. For example, at 1314, the control module 104 may accumulate detected features over multiple frames. Then, at 1316, the control module 104 may determine whether a distance between sets of the accumulated features is less than a defined distance threshold. If no at 1316, the process 1300 proceeds to 1212 of FIG. 12. If, however, the distance between sets of the accumulated features is less the defined distance threshold (e.g., within a defined distance of each other), the process 1300 proceeds to 1318 where the control module 104 removes or filters some of the accumulated (redundant) features. The process 1300 then proceeds to 1212 of FIG. 12.

At 1212, the control module 104 maps the detected features in the BEV image to the original (raw) images, as explained above. The process 1300 then proceeds to 1320, 1322 1324, 1326. At 1320, the control module 104 projects features from the original images to unit-image planes. At 1322, the control module 104 calculates an essential matrix based on the features from the unit-image planes. At 1324, the control module 104 accumulates camera-to-camera angles, such as roll, pitch, and yaw angles. At 1326, the control module 104 implements a post processing technique to obtain a converged pitch camera-to-camera pitch angle along with corresponding camera-to-camera roll and yaw angles, as explained above. The process 1300 then proceeds to 1214, 1216 as explained above relative to FIG. 12. The process 1300 then ends as shown in FIG. 13 or may optionally return to 1202 or another suitable step.

The vehicle systems and methods described herein improve camera alignment accuracy as compared to conventional methods for aligning cameras. For example, testing has shown that the vehicle systems and methods herein using BEV based camera-to-camera alignment provide improved accuracy as compared to a conventional perspective view based camera-to-camera alignment. For instance, vehicle standards may include various requirements including defined errors for calibration parameters, such as roll, pitch, and yaw angles. As example only, a requirement may be that a roll error for each different camera (e.g., the cameras 106, 108, 110, 112 and/or any other suitable camera/sensor) is one degree or less. Testing has shown that when the BEV based camera-to-camera alignment is employed in different scenarios (e.g., parking, in a subdivision, etc.), the roll errors for cameras in a vehicle are significantly less than one degree, and significantly less than roll errors for the same cameras using the conventional perspective view0based camera-to-camera alignment. In fact, when the conventional perspective view based camera-to-camera alignment is employed.), the roll errors for the cameras are often greater than one degree.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system for a vehicle, the vehicle system comprising:

a plurality of cameras including a first camera configured to capture original images in a first perspective relative to the vehicle and a second camera configured to capture original images in a second perspective relative to the vehicle different than the first perspective; and a controller in communication with the plurality of cameras, the controller configured to:

receive a first original image from the first camera and a second original image from the second camera;

select an overlapping local region of interest from the first original image and the second original image for a birds eye view image;

create the birds eye view image having the local region of interest based on pixel values of at least one of the first original image and the second original image and locations of the first camera and the second camera;

detect features in the birds eye view image using a spatial model of the local region of interest, the spatial model including a first feature matching threshold associated with a first area of the local region of interest adjacent to the vehicle and a second feature matching threshold associated with a second area of the local region of interest remote to the vehicle as compared to the first area of the local region of interest, wherein the second feature matching threshold is larger than the first feature matching threshold;

map detected features in the birds eye view image to the first original image and the second original image; and align at least the first camera and the second camera using the detected features.

2. The vehicle system of claim 1, wherein the controller is configured to control an operation of the vehicle based on the alignment between the first camera and the second camera.

3. The vehicle system of claim 1, wherein:

the first camera is a front fisheye camera configured to capture original images in a front perceptive of the vehicle; and the second camera is a left-side or right-side fisheye camera configured to capture original images in a left or right perceptive of the vehicle.

4. The vehicle system of claim 1, wherein the controller is configured to:

receive at least two frames corresponding to different times of the first original image from the first camera and at least two frames corresponding to different times of the second original image from the second camera;

subtract pixel values from the at least two frames of the first original image to obtain a normalized first original image;

subtract pixel values from the at least two frames of the second original image to obtain a normalized second original image;

detect features in the normalized first original image and the normalized second original image; and combine the detected features from the normalized first original image and the normalized second original image and the detected features from the birds eye view image.

5. The vehicle system of claim 1, wherein the controller is configured to:

generate a histogram equalized image based on the birds eye view image;

detect features in the histogram equalized image; and combine the detected features from the histogram equalized image and the detected features from the birds eye view image.

6. The vehicle system of claim 1, wherein the controller is configured to detect features in the local region of interest for the birds eye view image based on the first feature matching threshold and the second feature matching threshold.

7. The vehicle system of claim 1, wherein the controller is configured to filter one or more of the detected features.

8. The vehicle system of claim 7, wherein the controller is configured to filter the one or more of the detected features based on an association gate having a defined pixel area.

9. The vehicle system of claim 7, wherein the controller is configured to filter the one or more of the detected features based on a defined distance threshold.

10. A method for aligning a first camera and a second camera of a vehicle, the method comprising:

receiving a first original image from the first camera and a second original image from the second camera;

selecting an overlapping local region of interest from the first original image and the second original image for a birds eye view image;

creating the birds eye view image having the local region of interest based on pixel values of at least one of the first original image and the second original image and locations of the first camera and the second camera;

detecting features in the birds eye view image;

generating a histogram equalized image based on the birds eye view image;

detecting features in the histogram equalized image;

combining the detected features from the histogram equalized image and the detected features from the birds eye view image;

mapping the combined detected features from the histogram equalized image and the birds eye view image to the first original image and the second original image;

aligning at least the first camera and the second camera using the detected features; and controlling an operation of the vehicle based on the alignment between the first camera and the second camera.

11. The method of claim 10, wherein:

detecting features in the birds eye view image includes detecting features in the birds eye view image using a spatial model of the local region of interest;

the spatial model includes a first feature matching threshold associated with a first area of the local region of interest adjacent to the vehicle and a second feature matching threshold associated with a second area of the local region of interest remote to the vehicle as compared to the first area of the local region of interest; and the second feature matching threshold is larger than the first feature matching threshold.

12. The method of claim 10, further comprising filtering one or more of the detected features based on an association gate having a defined pixel area or based on a defined distance threshold.

13. A method for detecting features from a birds eye view image to align a first camera and a second camera of a vehicle, the method comprising:

receiving at least two frames corresponding to different times of a first original image from the first camera and at least two frames corresponding to different times of a second original image from the second camera;

creating the birds eye view image based on the first original image and the second original image;

detecting features in the birds eye view image including by implementing at least one pre-processing technique, wherein implementing at least one pre-processing technique includes subtracting pixel values from the at least two frames of the first original image to obtain a normalized first original image, subtracting pixel values from the at least two frames of the second original image to obtain a normalized second original image, detecting features in the normalized first original image and the normalized second original image, and combining the detected features from the normalized first original image and the normalized second original image;

mapping detected features in the birds eye view image to the first original image and the second original image; and aligning at least the first camera and the second camera using the detected features.

14. The method of claim 13, further comprising filtering one or more of the detected features based on an association gate having a defined pixel area.

15. The method of claim 13, further comprising filtering one or more of the detected features based on a defined distance threshold.

16. The method of claim 13, further comprising controlling an operation of the vehicle based on the alignment between the first camera and the second camera.

17. The method of claim 13, wherein:

the first camera is a front fisheye camera configured to capture original images in a front perceptive of the vehicle; and the second camera is a left-side or right-side fisheye camera configured to capture original images in a left or right perceptive of the vehicle.

18. The method of claim 13, further comprising displaying an image based on the alignment of at least the first camera and the second camera.

19. The method of claim 10, further comprising displaying an image based on the alignment of at least the first camera and the second camera.

20. The vehicle system of claim 1, further comprising a display in communication with the controller, the display configured to display an image based on the alignment of at least the first camera and the second camera.

* * * * *